United States Patent [19]

Sasaki et al.

[11] Patent Number: 5,095,516
[45] Date of Patent: Mar. 10, 1992

[54] WIDE-BAND OPTICAL FIBER COUPLER AND ITS MANUFACTURING METHOD

[75] Inventors: Hiroyuki Sasaki; Masato Shimamura, both of Tokyo; Yoshiaki Takeuchi, Mito; Hiroaki Hanafusa, Mito; Juichi Noda, Mito, all of Japan

[73] Assignees: Japan Aviation Electronics Industry Limited; Nippon Telegraph and Telephone Corporation, both of Tokyo, Japan

[21] Appl. No.: 584,709

[22] Filed: Sep. 19, 1990

[30] Foreign Application Priority Data

Sep. 20, 1989 [JP]  Japan .................................. 1-243979

[51] Int. Cl.$^5$ ................................................ G02B 6/26
[52] U.S. Cl. ............................................ 385/43; 385/51
[58] Field of Search ................... 350/96.15, 96.16, 320

[56] References Cited

U.S. PATENT DOCUMENTS

| | | | |
|---|---|---|---|
| 4,586,784 | 5/1986 | Tremblay et al. | 350/96.15 |
| 4,591,372 | 5/1986 | Bricheno et al. | 350/96.15 X |
| 4,798,438 | 1/1989 | Moore et al. | 350/96.15 |
| 4,997,247 | 3/1991 | Stowe | 350/96.15 |
| 4,997,248 | 3/1991 | Stowe | 350/96.15 |

FOREIGN PATENT DOCUMENTS

| | | |
|---|---|---|
| 0234665 | 9/1987 | European Pat. Off. . |
| 0369329 | 5/1990 | European Pat. Off. ......... 350/96.15 |
| 2822022 | 12/1978 | Fed. Rep. of Germany . |
| 90/08968 | 8/1990 | PCT Int'l Appl. . |

OTHER PUBLICATIONS

Tremblay et al, "Modal-Insensitive Biconical-Taper Couplers," *Optics Letters*, vol. 7, No. 10, Oct. 1982, pp. 506-8.

"Wavelength-Flattened Fused Couplers", *Electronic Letters*, vol. 21, No. 17, Aug. 15, 1985, pp. 742-743, Mortimore.

"Plastic Optical Fiber Star Coupler", by K. Imoto et al, *Applied Optics*, vol. 25, No. 19, 1 Oct. 1986, pp. 3443-3447.

*Primary Examiner*—John D. Lee
*Attorney, Agent, or Firm*—Pollock, Vande Sande and Priddy

[57] ABSTRACT

Two single mode optical fibers are stretched to form prestretched portions of different diameters, and then the optical fibers are fused together at their prestretched portions to form a coupling region which is stretched to obtain a wide-band optical fiber coupler of a desired splitting ratio.

1 Claim, 3 Drawing Sheets

WIDE-BAND OPTICAL FIBER COUPLER AND ITS MANUFACTURING METHOD

BACKGROUND OF THE INVENTION

The present invention relates to a wide-band single mode optical fiber coupler having reduced wavelength dependence of its splitting ratio and a method of making such an optical fiber coupler.

A conventional single mode optical fiber coupler of low wavelength dependence of its splitting ratio is produced by fusing together stretched and unstretched optical fibers of different propagation constants, as disclosed in PCT Publication W087/00934.

FIG. 1 shows the wavelength dependence of the splitting ratio of an optical fiber coupler manufactured using such single mode optical fibers of different propagation constants. FIG. 2 shows, for comparison, the wavelength dependence of the splitting ratio of an optical fiber coupler fabricated using optical fibers of the same propagation constant.

As will be seen from FIGS. 1 and 2, the splitting ratio of the latter optical fiber coupler varies sinusoidally between 0 and 100% with respect to the wavelength and its maximum value is 100%, whereas the splitting ratio of the former is maximum at a wavelength $\lambda_1$ and its value is smaller than 100%. Consequently, either of the two optical fiber couplers can be produced so that the splitting ratio at the wavelength $\lambda_1$ may be 50%, for instance, but the wavelength dependence of the splitting ratio in the vicinity of the wavelength $\lambda_1$ is more reduced and more flattened in the case of the former optical fiber coupler whose splitting ratio becomes maximum at the wavelength $\lambda_1$, than the wavelength dependence of the latter.

Conventionally, an optical fiber coupler having reduced wavelength dependence of the splitting ratio is produced by designing it so that the splitting ratio reaches a desired peak value at its center wavelength, through utilization of the effect that the maximum value of the splitting ratio becomes smaller than 100% in the optical fiber coupler fabricated using optical fibers of different propagation constants.

In the prior art optical fiber coupler, however, the wavelength dependence of the splitting ratio is not sufficiently reduced, because its reduction relies solely on the idea of making the maximum value of the splitting ratio become a desired value smaller than 100% at the center wavelength.

SUMMARY OF THE INVENTION

It is therefore an object of the present invention to provide a wide-band single mode optical fiber coupler having reduced wavelength dependency of the splitting ratio.

Another object of the present invention is to provide a method of making such a wide-band optical fiber coupler.

The wide-band optical fiber coupler of the present invention is composed of at least two optical fibers having stretched portions of different diameters fused together and stretched.

According to the manufacturing method of the present invention, at least two optical fibers of substantially the same propagation constant are stretched by a different length to form stretched portions, and the two optical fibers are fused together at their prestretched portions to form a coupling region, which is then stretched.

In the case where prestretched optical fibers are fused together and then stretched again, there occurs a phenomenon that the wavelength at which coupling starts becomes shorter, that is, the period of the wavelength dependence of the splitting ratio becomes longer than in the case where optical fibers are fused together without being prestretched.

The present invention utilizes the discovery of such a phenomenon. According to the present invention, the optical fibers are each prestretched to prolong the period of the wavelength dependence of the splitting ratio and hence reduce the wavelength dependence, and in this instance, the optical fibers are each prestretched a different length to introduce therebetween a difference in the propagation constant and the maximum value of the splitting ratio is selected smaller than 100% to thereby reduce the wavelength dependence of the splitting ratio.

DESCRIPTION OF THE PREFERRED EMBODIMENTS

Figure 1:
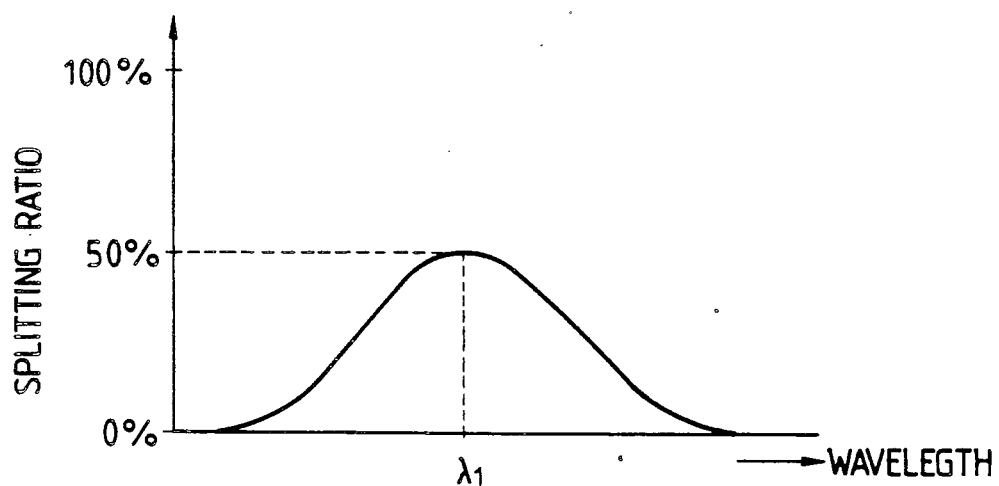
FIG. 1 is a graph showing the wavelength dependence of the splitting ratio of an optical fiber coupler produced using optical fibers of different propagation constants according to a conventional method.
Figure 2:
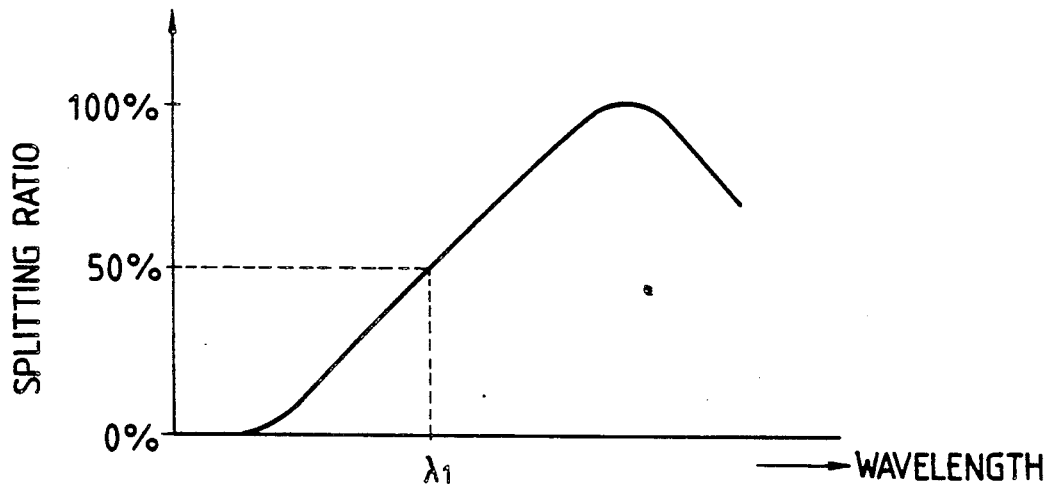
FIG. 2 is a graph showing the wavelength dependence of the splitting ratio of an optical fiber coupler produced using optical fibers of the same propagation constant according to a conventional method.
Figure 3A:
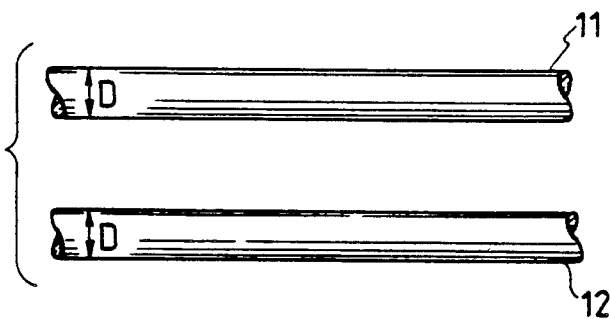
FIG. 3A–3D are diagrams illustrating a sequence of steps involved in the manufacture of the optical fiber coupler according to the present invention.
Figure 3B:
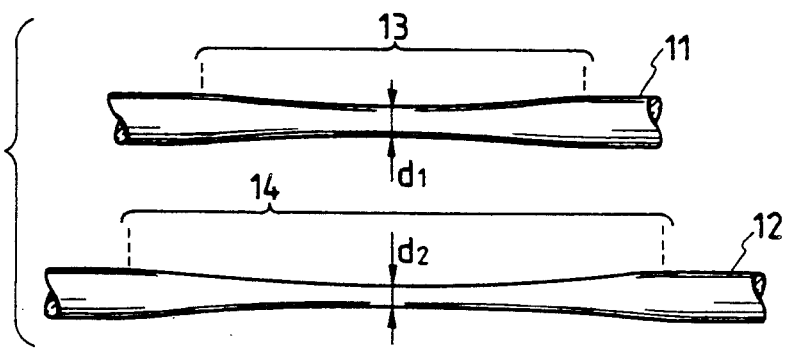
Figure 3C:
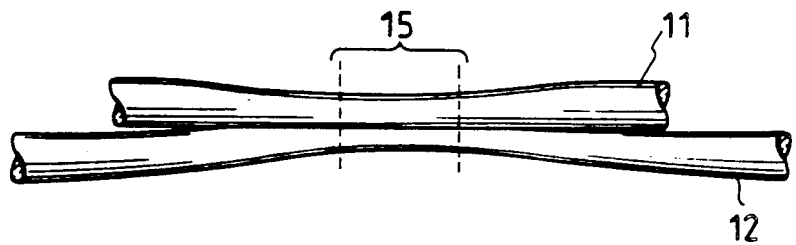
Figure 3D:
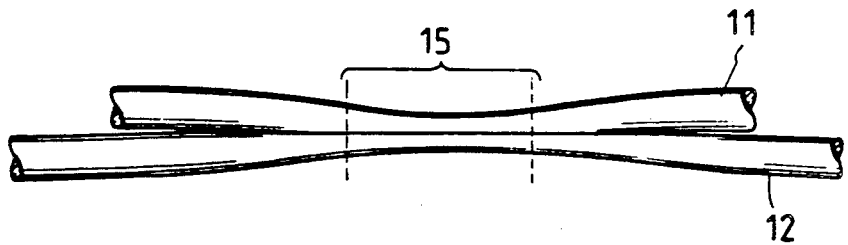

Referring now to FIG. 3, the single mode optical fiber coupler manufacturing method according to the present invention will be described. At first, two single mode optical fibers 11 and 12 of the same propagation constant (i.e. of the same diameter D), shown in step A in FIG. 3, are both stretched while being heated as shown in step B. In this instance, the one optical fiber 12 is stretched more than the other 11 to make the minimum diameter $d_2$ of the prestretched portion 14 of the former smaller than the minimum diameter $d_1$ of the prestretched portion 13 of the latter, thereby introducing a difference in the propagation constant between the prestretched portions 13 and 14. Next, as shown in step C, the prestretched portions 13 and 14 of the two optical fibers 11 and 12 are held in parallel juxtaposition with one another and fused together centrally thereof to form a coupling portion 15, which is then stretched as shown in step D.

Figure 4:
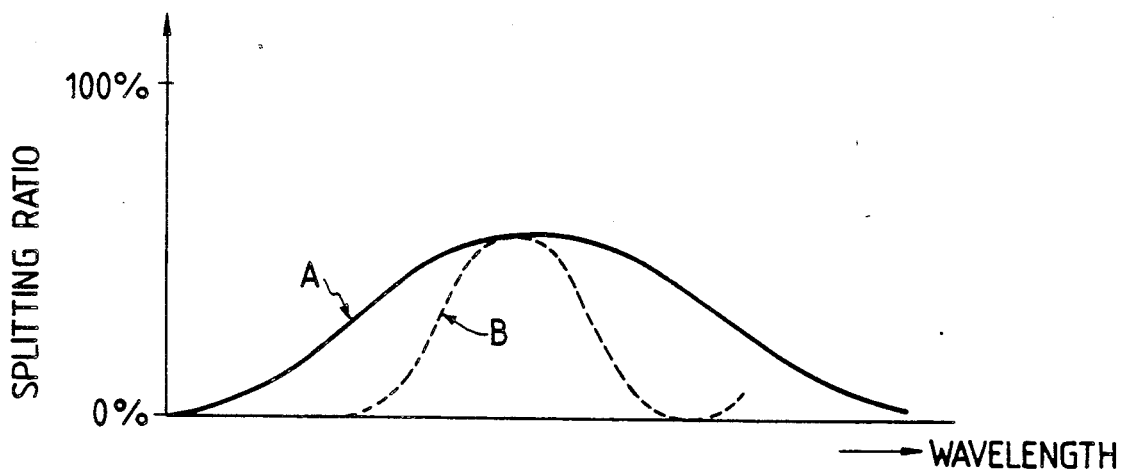
FIG. 4 is a graph showing the wavelength dependence of the splitting ratios of the optical fiber coupler according to the present invention and the conventional optical fiber coupler.

In FIG. 4 the curve A indicates the wavelength dependence of the splitting ratio of the optical fiber coupler thus manufactured. The curve B shows, for comparison, the wavelength dependence of a conventional wide-band optical fiber coupler fabricated by fusing together and stretching two optical fibers of different diameters without involving the prestretching step depicted in step B in FIG. 3. As will be seen from FIG. 4, the wavelength dependence of the splitting ratio of the optical fiber coupler according to the present invention is reduced more than in the case of the conventional optical fiber coupler. This is based on the discovery of the following fact.

Figure 5:
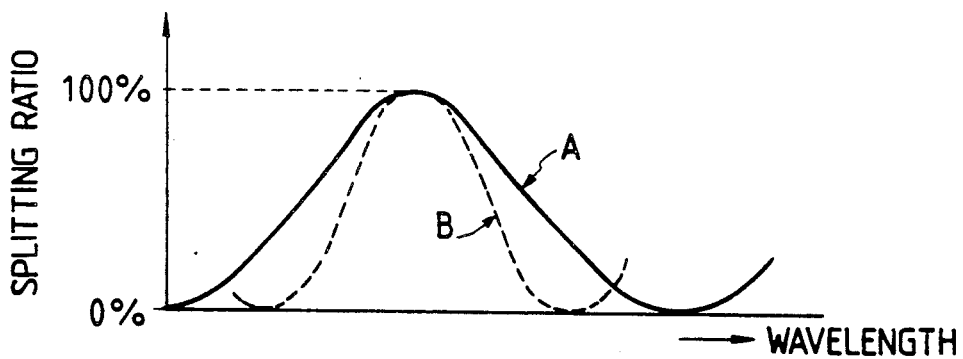
FIG. 5 is a graph showing the wavelength dependence of the splitting ratio of an optical fiber coupler produced using equally prestretched optical fibers of the same propagation constant and the wavelength dependence of the splitting ratio of an optical fiber coupler produced without prestretching the optical fibers.

In FIG. 5, the curve A shows the wavelength dependence of the splitting ratio of a first optical fiber coupler produced by fusing together and then stretching two optical fibers of the same propagation constant (i.e. of the same outer diameter) and equally prestretched (consequently, the prestretched portions are equal in diameter and hence are nearly equal in propagation constant). Since the two optical fibers are equal in diameter even after being fused together and stretched, the splitting ratio of the optical fiber coupler varies sinusoidally from 0 to 100% with respect to the wavelength as predicted. In this instance, however, the period of the variation is relatively long.

The curve B in FIG. 5 shows the wavelength dependence of the splitting ratio of a second optical fiber coupler produced by fusing together two unstretched optical fibers of the same outer diameter and stretching their coupling region. The length by which the coupling region is stretched is equal to the sum of the length by which each optical fiber is stretched and the length by which the coupling region is stretched in the fabrication of the first optical fiber coupler. Also in this case, since the two optical fibers are equal in propagation constant after being fused together and stretched, the splitting ratio of the optical fiber coupler varies sinusoidally from 0 to 100% with respect to the wavelength, but the period of its variation is shorter than in the case of the curve A.

Thus, the optical fiber coupler produced by fusing together two prestretched optical fibers and then stretching their coupling region is longer in the period of the wavelength dependence of the splitting ratio than the optical fiber coupler fabricated by fusing together two unstretched optical fibers and then stretching their coupling region, and hence has reduced wavelength dependence of the splitting ratio. This is considered to be related to the fact that since the optical fibers are prestretched in the first optical fiber coupler, the length by which the fused fibers are stretched, i.e. the length by which the coupling is stretched is shorter than in the case of the second optical fiber coupler. The present invention applies the discovery of the above-mentioned fact to the wide-band optical fiber coupler employing two optical fibers of different propagation constants and permits the realization of a wide-band optical fiber coupler having reduced wavelength dependence of its splitting ratio.

Figure 6:
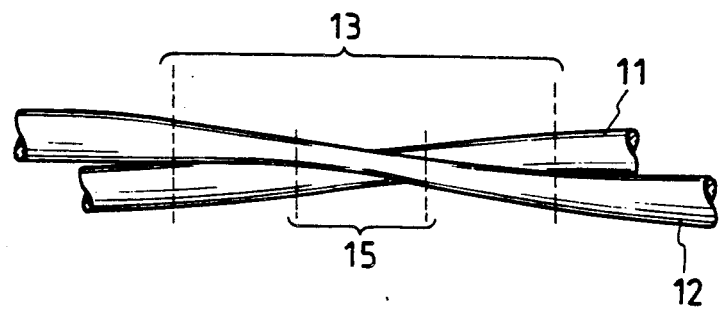
FIG. 6 is a diagram illustrating another embodiment of the present invention.

FIG. 6 illustrates another embodiment of the present invention, in which in the manufacturing step C shown in FIG. 3 the optical fibers 11 and 12 are not maintained in parallel juxtaposition with each other but instead are held with their prestretched portions 13 intersecting each other at a small angle as shown and fused together at their central portions 15, thereafter being drawn. By intersecting the optical fibers 11 and 12 with each other as mentioned above, the minimum diameter portions of the optical fibers which are the central portions 15 of their prestretched portions 13 can easily be held in contact with each other.

As described above, the present invention makes the maximum value of the splitting ratio smaller than 100% through utilization of the difference in the propagation constant between two optical fibers to reduce the wavelength dependence of the splitting ratio and, further, by prestretching the optical fibers, prolongs the period of the wavelength dependence of the splitting ratio to reduce the wavelength dependence. Hence, the present invention affords sufficient reduction of the wavelength dependence of the splitting ratio as a whole.

It is apparent that many modifications and variations may be effected without departing from the scope of the novel concepts of the present invention.

What is claimed is:

1. A method of making a wide-band single mode optical fiber coupler comprising the steps of:
    stretching first and second optical fibers originally of the same propagation constant to form prestretched portions of different diameters in said fibers;
    holding said first and second optical fibers in parallel juxtaposition with each other with their prestretched portions being in lateral contact with each other substantially centrally thereof;
    fusing together said first and second optical fibers at said prestretched portions thereof to form a coupling region; and
    stretching said coupling region.

* * * * *